(12) United States Patent
Nimitz

(10) Patent No.: US 6,270,689 B1
(45) Date of Patent: *Aug. 7, 2001

(54) BLEND COMPOSITIONS OF TRIFLUOROIODOMETHANE, TETRAFLUOROETHANE AND DIFLUOROETHANE

(75) Inventor: Jonathan S. Nimitz, Albuquerque, NM (US)

(73) Assignee: Ikon Corporation, Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/048,658

(22) Filed: Mar. 26, 1998

(51) Int. Cl.$^7$ .................................................. C09K 5/00
(52) U.S. Cl. ............................. 252/67; 62/114; 510/410
(58) Field of Search ................. 252/67; 62/114; 510/410

(56) References Cited

U.S. PATENT DOCUMENTS

| | | | |
|---|---|---|---|
| 2,992,279 | 7/1961 | Haszeldine | 570/131 |
| 3,008,966 | 11/1961 | Hauptschein et al. | 540/11 |
| 4,005,137 | 1/1977 | Rudolph et al. | 565/605 |
| 4,097,344 | 6/1978 | Drury | 205/415 |
| 4,118,290 | 10/1978 | Semmler et al. | 205/460 |
| 4,221,734 | 9/1980 | Commeyras et al. | 554/75 |
| 4,560,697 | 12/1985 | Richardson et al. | 514/383 |
| 4,581,101 | 4/1986 | Senoue et al. | 438/706 |
| 4,587,366 | 5/1986 | von Werner | 570/172 |
| 4,616,027 | 10/1986 | Richardson et al. | 514/383 |
| 4,692,536 | 9/1987 | Lang | 556/413 |
| 4,717,744 | 1/1988 | Boutevin et al. | 524/17 |
| 4,810,403 * | 3/1989 | Bivens et al. | 252/67 |
| 5,004,567 | 4/1991 | Takahashi et al. | 554/153 |
| 5,105,034 | 4/1992 | Tonelli et al. | 570/173 |
| 5,276,194 | 1/1994 | May | 564/409 |
| 5,382,723 | 1/1995 | Durual et al. | 570/176 |
| 5,406,008 | 4/1995 | Sievert | 570/123 |
| 5,496,901 | 3/1996 | DeSimone | 526/89 |
| 5,605,647 * | 2/1997 | Nimitz et al. | 252/67 |
| 5,611,210 * | 3/1997 | Nimitz et al. | 62/114 |
| 5,716,549 * | 2/1998 | Nimitz et al. | 252/364 |

FOREIGN PATENT DOCUMENTS

| | | |
|---|---|---|
| 63-308084 * | 12/1988 | (JP) . |
| 4-323294 | 11/1992 | (JP) . |
| 94/20588 * | 9/1994 | (WO) . |
| 97/15637 * | 5/1997 | (WO) . |

OTHER PUBLICATIONS

NIST Technical Note 1279: Construction of an Exploratory List of Chemicals to Initiate the Search for Halon Alternatives, Pitts et al, Aug. 1990, pp. 59–62 and 80–93.
DTIC Technical Report for the period Sep. 1, 1947 to Jun. 30, 1950.

* cited by examiner

Primary Examiner—Necholus Ogden
(74) Attorney, Agent, or Firm—Dinsmore & Shohl LLP

(57) ABSTRACT

Compositions suitable for use as refrigerants comprise blends of trifluoroiodomethane, 1,1,1,2-tetrafluoroethane and 1,1-difluoroethane. Preferred compositions are non-flammable and at least near azeotropic.

22 Claims, No Drawings ary, the present invention is directed to compositions comprising blends of trifluoroiodomethane, 1,1,1,2-tetrafluoroethane and 1,1-difluoroethane, and the use of such compositions for providing refrigeration.

BLEND COMPOSITIONS OF TRIFLUOROIODOMETHANE, TETRAFLUOROETHANE AND DIFLUOROETHANE

FIELD OF THE INVENTION

The present invention is directed to compositions which may be used in place of chlorofluorocarbons (CFCs) and/or hydrochlorofluorocarbons (HCFCs) in various applications. The compositions of the invention may also be used partially or entirely in place of hydrofluorocarbons (HFCs). More particularly, the present invention is directed to compositions comprising blends of trifluoroiodomethane, 1,1,1,2-tetrafluoroethane and 1,1-difluoroethane, and the use of such compositions for providing refrigeration.

BACKGROUND OF THE INVENTION

Chlorofluorocarbons (CFCs), hydrochlorofluorocarbons (HCFCs) and/or blends containing these compounds have conventionally been used as refrigerants, solvents, foam blowing agents, propellants and the like. However, because of their high chemical stability and long atmospheric lifetimes, such compounds, when released to the atmosphere, migrate to the stratosphere where they undergo photolysis and deplete the earth's protective ozone layer. CFCs particularly contribute to depletion of the ozone layer, with the HCFCs depleting the ozone layer to a lesser extent. As a result, production of CFCs and HCFCs has been and continues to be severely limited and is scheduled for phase out in many industrialized and non-industrialized countries.

Accordingly, a need exists to develop materials which can be used as efficient and economical substitutes for CFC and/or HCFCs in a wide variety of applications, including refrigeration, solvent use (for example in chemical manufacturing and solvent cleaning applications), polymer foam blowing, and propulsion (for example, aerosol propellants), and the like. The Nimitz et al U.S. Pat. Nos. 5,444,102, 5,562,861, 5,605,647 and 5,611,210 broadly disclose blends of fluoroiodocarbon compounds and various additives as substitutes for CFCs, HCFCs and/or Halons. The fluoroiodocarbon blends of Nimitz et al are disclosed as advantageous for use in a variety of applications, including refrigeration, solvent cleaning, foam blowing, aerosol propulsion and firefighting, owing to the desirable combinations of properties provided by such blends. For example, the blends are disclosed as nonflammable, non-toxic and environmentally benign in having zero ozone depletion potentials, low global warming potentials and negligible atmospheric and terrestrial environmental impacts.

While the compositions broadly disclosed by Nimitz et al are useful in a variety of applications, a need still exists for developing compositions with a particular combination of properties for more specific applications. For example, in the refrigeration area, suitable replacements for CFCs, HCFCs and/or HFCs must be non-flammable and unreactive and substantially non-fractioning over a wide range of temperatures, for example from about −98° C. to about 90° C., or even wider. While the majority of residential, commercial and institutional refrigeration devices operate in the range of from about −23° C. to about 8° C., and in extraordinary cases, higher temperatures may be experienced. Thus, suitable compositions for refrigeration must not significantly fractionate or change composition over these temperature ranges to avoid becoming flammable. Additionally, for compositions to be suitable refrigerant replacements for CFCs, HCFCs and/or HFCs, the compositions must exhibit good miscibility with refrigeration lubricants such as polyol ester lubricants. Further, in order for a composition to adequately serve as a replacement for CFCs, HCFCs and/or HFCs, the substitute compositions must be effective under the operating conditions of conventional refrigeration equipment, thereby serving as "drop in" replacements for CFCs, HCFCs and/or HFCs or "near drop in" replacements for such materials, requiring only minor changes in lubricant, equipment, for example expansion valves, or the like. In view of this combination of necessary properties, a need still exists for further development of suitable replacement materials, particularly for refrigeration applications.

SUMMARY OF THE INVENTION

Accordingly, it is an object of the present invention to provide new compositions, and particularly compositions which may be used in place of conventionally employed CFCs and/or HCFCs in one or more applications. It is a further object of the invention to provide fluoroiodocarbon-containing compositions which may be used as replacements for CFCs and/or HCFCs. It is an additional object to provide fluoroiodocarbon-containing compositions which may be used to partially or fully replace hydrofluorocarbon (HFC) compositions. It is yet a further object to provide compositions which are suitable for providing refrigeration and to provide refrigeration methods employing such compositions.

These and additional objects are provided by the compositions and methods of the present invention. Broadly, the present invention is directed to compositions comprising blends of trifluoroiodomethane, 1,1,1,2-tetrafluoroethane, and 1,1-difluoroethane, and to methods employing such compositions for providing refrigeration. The compositions of the invention exhibit an advantageous combination of physical properties which allow the compositions to be economically and efficiently useful for, inter alia, providing refrigeration. More specific embodiments of the compositions and methods of the invention, and further advantages thereof, will be apparent in view of the following detailed description.

DETAILED DESCRIPTION

The compositions of the present invention comprise blends of trifluoroiodomethane, 1,1,1,2-tetrafluoroethane (commonly referred to as HFC-134a) and 1,1-difluoroethane (commonly referred to as HFC-152a). It has been determined that compositions comprising blends of these three specific compounds are particularly advantageous for use in refrigeration applications. In a preferred embodiment, the compositions comprise blends of from about 25 mol percent to about 45 mol percent trifluoroiodomethane and a balance of 1,1,1,2-tetrafluoroethane and 1,1-difluoroethane. In a further preferred embodiment, the balance of 1,1,1,2-tetrafluoroethane and 1,1-difluoroethane comprises equal molar amounts of the two compounds 1,1,1,2-tetrafluoroethane and 1,1-difluoroethane.

In an alternate embodiment, the compositions of the invention are directed to blends of from about 25 mol percent to about 45 mol percent trifluoroiodomethane, from about 25 mol percent to about 50 mol percent 1,1,1,2-tetrafluoroethane, and from about 25 mol percent to about 50 mol percent 1,1-difluoroethane. More preferably, such compositions comprise blends of from about 30 mol percent to about 40 mol percent trifluoroiodomethane, from about 25 mol percent to about 35 mol percent 1,1,1,2- tetrafluoroethane and from about 25 mol percent to about 35 mol percent 1,1-difluoroethane. Even more preferred, the compositions are directed to blends of from about 30 mol percent to about 40 mol percent trifluoroiodomethane, from about 30 mol percent to about 35 mol percent 1,1,1,2-tetrafluoroethane and from about 30 mol percent to about 35 mol percent 1,1-difluoroethane. Further preferred compositions comprise from about 34 mol percent to about 38 mol percent trifluoroiodomethane and from about 30 mol percent to about 35 mol percent each of 1,1,1,2-tetrafluoroethane and 1,1-difluoroethane.

In further embodiments of the invention, the compositions consist essentially of the indicated blends of trifluoroiodomethane, 1,1,1,2-tetrafluoroethane and 1,1-difluoroethane, whereby other components which might materially effect the essential characteristics of the compositions are excluded. For example, in preferred embodiments, the compositions of the invention are non-flammable and are azeotropic or near azeotropic, whereby the compositions are physically stable and do not substantially fractionate during use. Within the context of the present invention, near-azeotropic compositions are those in which the difference in vapor pressures of the components at room temperature is less than 10 psi. Accordingly, the compositions according to the present invention which consist essentially of the recited components in the various preferred embodiments exclude components which would render the compositions flammable and/or render the compositions non-azeotropic or non-near azeotropic, thereby causing the compositions to exhibit substantial fractionation among the components.

The compositions according to the present invention are particularly suitable for use in methods for providing refrigeration wherein a refrigerating amount of a composition is provided in a cooling system and the cooling system is operated to provide refrigeration. As is well known in the refrigeration art, extensive refrigeration and air conditioning equipment conventionally designed for use with CFCs and/or HCFCs is currently in existence. The compositions of the present invention are particularly suitable for use as replacements for the CFCs and/or HCFCs, and are suitable for use with the pre-existing equipment under normal operating conditions. The present compositions are also suitable replacements for pure HFC compositions. For example, the compositions can be used as suitable replacements for HFC-134a and provide higher energy efficiency and capacity, a significantly decreased global warming potential (decreased by almost two thirds), and significantly decreased total equivalent warming impact (TEWI). Use of the compositions according to the invention may require some minor modification of conventional equipment, for example, exchanging a mineral oil lubricant in the system to a polyol ester lubricant, changing an expansion valve, or the like. Thus, the compositions allow pre-existing equipment to be used for its designed lifetime and avoids the requirement for a significant investment in new equipment which is often necessary for other substitute materials not exhibiting the "drop in" or "near drop in" replacement ability.

The compositions of the present invention are suitable for use in refrigeration systems operating over conventional temperature ranges, and over wider temperature ranges, if necessary. The compositions also exhibit good miscibility with polyol ester lubricants. As is known in the art, refrigeration equipment commonly requires constant circulation of a lubricant in the refrigerant fluid to avoid friction, overheating and burnout of the compressor and/or bearings. The compositions of the present invention are particularly suitable for use in connection with the polyol ester lubricants commonly employed for these purposes.

The compositions according to the invention are also particularly suitable for use in methods for providing refrigeration in view of their refrigeration performance properties, physical stability, electrical non-conductivity, low toxicity, non-flammability (self-extinguishing), short atmospheric lifetime, zero ozone depletion potential, low global warming potential, and negligible terrestrial environmental impact. Thus, the compositions are suitable replacements for various conventional CFC and HCFC refrigerants. Importantly, the present compositions are suitable for use as low global warming and low-TEWI (total equivalent warming impact) replacements for HFC 134a.

The components of the compositions of the invention may be manufactured according to known techniques and are all commercially available. Additionally, the compositions according to the present invention are prepared by simple blending of the components in accordance with conventional techniques, or in accordance with other methods known in the art.

The compositions of the present invention are demonstrated by the following examples.

EXAMPLE 1

Compositions comprising 29 mol percent trifluoroiodomethane, 35.5 mol percent 1,1,1,2-tetrafluoroethane and 35.5 mol percent 1,1-difluoroethane and comprising 27.5 mol percent trifluoroiodomethane, 36.25 mol percent 1,1,1,2-tetrafluoroethane and 36.25 mol percent 1,1-difluoroethane were prepared. Each of these blends was subjected to flammability testing according to revised ASTM E-681 guidelines using a 12-liter flask and an electric spark arranged one-third of the distance from the base to the neck of the flask and offset from the center of the flask. The borderline for flammability classification was a flame extending outside a cone arranged at a 45° angle in an upward direction from the spark, with compositions exhibiting lesser flame travel being classified as non-flammable. Both of the aforementioned compositions according to the present invention were measured as non-flammable for concentrations of from about 3% to 18% in air.

Fractionation tests according to Underwriters Laboratories (UL) guidelines were conducted for a 90% filled container at room temperature (25° C.) and a 90% filled container at 54° C., respectively, using the composition comprising 29 mol percent trifluoroiodomethane and 35.5 mol percent of each of 1,1,1,2-tetrafluoroethane and 1,1-difluoroethane. In the fractionation test performed using a 90% filled container at room temperature, the final resulting composition was approximately 28 mol percent trifluoroiodomethane, 40.5 mol percent 1,1,1,2-tetrafluoroethane and 31.5 mol percent 1,1-difluoroethane. This composition was tested as non-flammable according to ASTM E-68 1 as described above. The fractionation test conducted using a 90% filled container at 54° C. yielded a composition comprising 31 mol percent trifluoroiodomethane, 38 mol percent 1,1,1,2-tetrafluoroethane and 31 mol percent 1,1-difluoroethane. The resulting composition was tested as non-flammable according to an ASTM E-681 as described above. Thus, the subject composition did not substantially fractionate and importantly yielded compositions with maintained non-flammable properties.

The present compositions are charged into existing refrigeration units, one of which was designed for use with Freon-12 and the other of which was designed for use with pure 1,1,1,2-tetrafluoroethane. In the unit designed for use with Freon-12, a mineral oil lubricant is removed and replaced with a conventional polyol ester oil lubricant. The charged refrigeration units are operated to provide good cooling performance with energy efficiency and capacity superior to the original refrigerants.

EXAMPLE 2

A composition according to the present invention is prepared by blending about 37 mol percent trifluoroiodomethane and about 31.5 mol percent of each of 1,1,1,2-tetrafluoroethane and 1,1-difluoroethane. The blend is charged in a 5-ton chiller unit designed for R-12, from which the R-12 had been previously removed and recovered. Before charging the chiller with the inventive composition, the lubricating oil in the chiller is removed and replaced with a polyol ester lubricant. Monitored operation of the chiller unit demonstrates that operation with the inventive composition increases the capacity of the unit and increases the energy efficiency as compared with operation of the unit with R-12.

EXAMPLE 3

A composition according to the present invention is prepared by blending about 35.5 mol percent trifluoroiodomethane and about 32.25 mol percent each of 1,1,1,2-tetrafluoroethane and 1,1-difluoroethane, and is used as the refrigerant composition in a conventional five ton R-12 chiller. Compared with operation of the chiller using R-12 as the refrigerant, operation of the chiller with the inventive composition provides 1% better energy efficiency and 16% higher capacity. The chiller is equipped with the conventional R-12 expansion valve for operation using either R-12 or the inventive composition as the refrigerant. Compared with the operation of the chiller using HPC-134a as the refrigerant and a conventional 134a expansion device, operation of the chiller with the inventive composition provides 16% better energy efficiency and identical capacity.

The preceding examples and specific embodiments are provided in order to illustrate the compositions and methods of the present invention and are not intended to be limiting thereof. Additional embodiments within the scope of the invention will be apparent to those of ordinary skill in the art.

What is claimed is:

1. A composition comprising a blend of from about 25 mol percent to about 40 mol percent trifluoroiodomethane, from about 25 mol percent to about 50 mol percent 1,1,1,2-tetrafluoroethane and from about 25 mol percent to about 50 mol percent 1,1-difluoroethane.

2. A composition according to claim 1, comprising a blend of from about 30 mol percent to about 40 mol percent trifluoroiodomethane, from about 25 mol percent to about 35 mol percent 1,1,1,2-tetrafluoroethane and from about 25 mol percent to about 35 mol percent 1,1-difluoroethane.

3. A composition according to claim 1, comprising a blend of from about 30 mol percent to about 40 mol percent trifluoroiodomethane, from about 30 mol percent to about 35 mol percent 1,1,1,2-tetrafluoroethane and from about 30 mol percent to about 35 mol percent 1,1-difluoroethane.

4. A composition according to claim 1, comprising a blend of from about 25 mol percent to about 40 mol percent trifluoroiodomethane, and a balance of 1,1,1,2-tetrafluoroethane and 1,1-difluoroethane.

5. A composition according to claim 1, comprising a blend of from about 25 mol percent to about 40 mol percent trifluoroiodomethane, and a balance of approximately equal molar amounts of 1,1,1,2-tetrafluoroethane and 1,1-difluoroethane.

6. A composition according to claim 5, comprising a blend of from about 30 mol percent to about 40 mol percent trifluoroiodomethane.

7. A composition according to claim 5, comprising a blend of from about 34 mol percent to about 38 mol percent trifluoroiodomethane.

8. A composition according to claim 1, wherein the composition is nonflammable.

9. A composition according to claim 1, consisting essentially of the blend of the trifluoroiodomethane, 1,1,1,2-tetrafluoroethane and 1,1-difluoroethane.

10. A composition according to claim 2, consisting essentially of the blend of the trifluoroiodomethane, 1,1,1,2-tetrafluoroethane and 1,1-difluoroethane.

11. A composition according to claim 3, consisting essentially of the blend of the trifluoroiodomethane, 1,1,1,2-tetrafluoroethane and 1,1-difluoroethane.

12. A method of providing refrigeration, comprising the steps of:
(a) providing a refrigerating amount of a refrigerant composition in a cooling system, and
(b) operating the cooling system,
the refrigerant composition comprising a blend of from about 25 mol percent to about 40 mol percent trifluoroiodomethane, from about 25 mol percent to about 50 mol percent 1,1,1,2-tetrafluoroethane and from about 25 mol percent to about 50 mol percent 1,1-difluoroethane.

13. A method according to claim 12, wherein the refrigerant composition comprises a blend of from about 30 mol percent to about 40 mol percent trifluoroiodomethane, from about 25 mol percent to about 35 mol percent 1,1,1,2-tetrafluoroethane and from about 25 mol percent to about 35 mol percent 1,1-difluoroethane.

14. A method according to claim 12, wherein the refrigerant composition comprises a blend of from about 30 mol percent to about 40 mol percent trifluoroiodomethane, from about 30 mol percent to about 35 mol percent 1,1,1,2-tetrafluoroethane and from about 30 mol percent to about 35 mol percent 1,1-difluoroethane.

15. A method according to claim 12, wherein the refrigerant composition consists essentially of a blend of from about 30 mol percent to about 40 mol percent trifluoroiodomethane, from about 25 mol percent to about 35 mol percent 1,1,1,2-tetrafluoroethane and from about 25 mol percent to about 35 mol percent 1,1-difluoroethane.

16. A method according to claim 12, wherein the refrigerant composition consists essentially of a blend of from about 30 mol percent to about 40 mol percent trifluoroiodomethane, from about 30 mol percent to about 35 mol percent 1,1,1,2-tetrafluoroethane and from about 30 mol percent to about 35 mol percent 1,1,-difluoroethane.

17. A composition according to claim 9, wherein the difference in vapor pressures of the trifluoroiodomethane, 1,1,1,2-tetrafluoroethane and difluoroethane at room temperature is less than 10 psi.

18. A method according to claim 15, wherein the difference in vapor pressures of the trifluoroiodomethane, 1,1,1,2-tetrafluoroethane and difluoroethane at room temperature is less than 10 psi.

19. A composition, consisting essentially of a blend of from about 30 mol percent to about 40 mol percent trifluoroiodomethane, from about 25 mol percent to about 35 mol percent 1,1,1,2-tetrafluoroethane, and from about 25 mol percent to about 35 mol percent 1,1-difluoroethane, wherein the composition is nonflammable.

20. A composition according to claim 19, consisting essentially of a blend of from about 34 mol percent to about 38 mol percent trifluoroiodomethane, from about 30 mol percent to about 35 mol percent 1,1,1,2-tetrafluoroethane, and from about 30 mol percent to about 35 mol percent 1,1-difluoroethane.

21. A composition according to claim 1, wherein the composition is operable as a drop-in or near drop-in replacement refrigerant in refrigeration equipment designed for use with 1,1,1,2-tetrafluoroethane or dichlorodifluoromethane.

22. A method according to claim 12, wherein the refrigerant composition is operable as a drop-in or near drop-in replacement refrigerant in refrigeration equipment designed for use with 1,1,1,2-tetrafluoroethane or dichlorodifluoromethane.

* * * * *

UNITED STATES PATENT AND TRADEMARK OFFICE
CERTIFICATE OF CORRECTION

PATENT NO.   : 6,270,689 B1
DATED        : August 7, 2001
INVENTOR(S)  : Jonathan S. Nimitz It is certified that error appears in the above-identified patent and that said Letters Patent is hereby corrected as shown below:

<u>Column 8,</u>
After claim 22, add the following claim 23, based on application claim 19:

-- 23.   A method according to claim 12, wherein the refrigerant composition consists essentially of a blend of from about 30 mol percent to about 40 mol percent trifluoroiodomethane, and a balance of approximately equimolar amounts of 1,1,1,2-tetrafluoroethane and 1,1-difluoroethane. --

Signed and Sealed this

Ninth Day of July, 2002

*Attest:*

JAMES E. ROGAN
*Attesting Officer*   *Director of the United States Patent and Trademark Office*